Dec. 28, 1948.  C. H. TOWNES  2,457,287
AIR SPEED INDICATING SYSTEM
Filed July 7, 1944
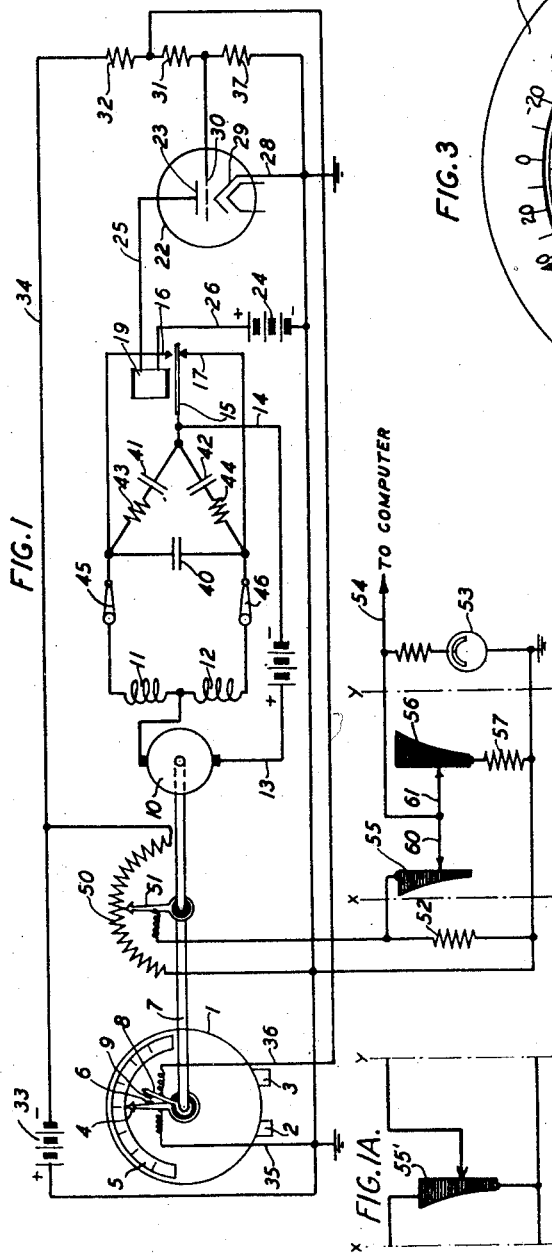
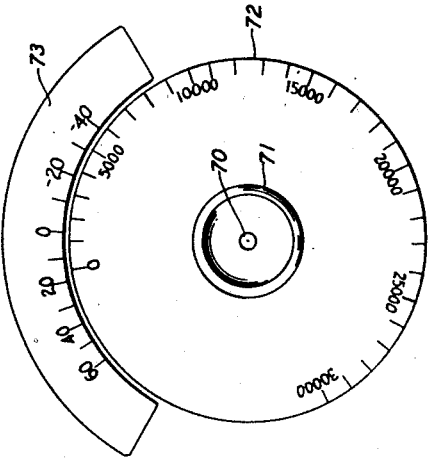
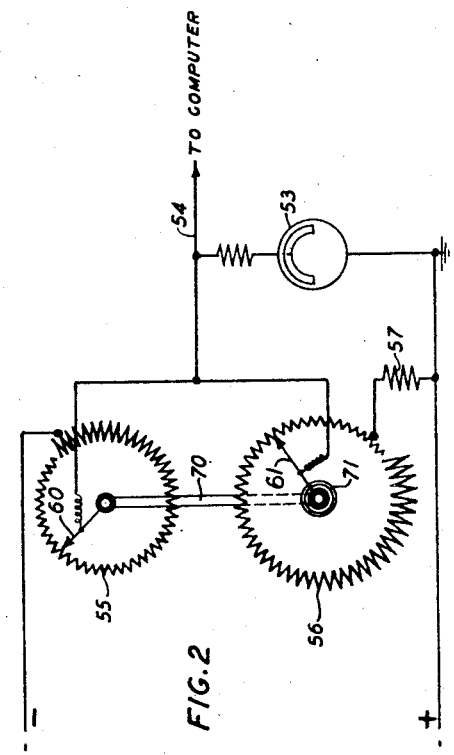
INVENTOR
C. H. TOWNES
BY
J. F. McEneany
ATTORNEY Patented Dec. 28, 1948

2,457,287

UNITED STATES PATENT OFFICE 2,457,287

AIR-SPEED INDICATING SYSTEM

Charles H. Townes, Delray Beach, Fla., assignor to Bell Telephone Laboratories, Incorporated, New York, N. Y., a corporation of New York Application July 7, 1944, Serial No. 543,935

4 Claims. (Cl. 73—182)

This invention relates to an improved means for obtaining the true air speed of an aircraft in air of known temperature and pressure.

It is the object of this invention to provide a system of electrical apparatus by means of which an electrical quantity proportional to indicated air speed may be derived and this electrical quantity modified proportionally to known temperature and pressure conditions at the flight altitude to produce an electrical quantity proportional to true air speed.

It is a further object of this invention to provide in an electrical air speed indicating system an electrical element for modifying an electrical quantity proportional to indicated air speed by means of which both temperature and pressure modifications may be introduced by operation of a single control element.

A feature of the invention resides in the provision of an electrical system including a source of voltage, a potentiometer and a motor controlled follow-up system associated with the movable element of a Pitot-static tube air speed indicator to derive, by means of the potentiometer, a voltage proportional to the indication of the air speed indicator.

A further feature of the invention resides in the provision of a voltage divider in the electrical system comprising a resistance element which is shaped to give an exponential variation in resistance along its length and with which is provided an altitude scale movable with the resistance tap adjacent a fixed scale representing temperatures, the scales being so calibrated that the registration of the indication representing the known altitude with the indication representing the known temperature will position the resistance tap to introduce the electrical modification required to correct the indicated air speed voltage to a voltage corresponding to true air speed less at flight altitude.

The air speed indicator usually employed in aircraft comprises a differential pressure type instrument known as the Pitot-static tube indicator which has connections to the pressure and static tube lines of the aircraft. This instrument gives air speed indications which are correct for the average density at ground level. As the density of the air varies inversely as the temperature and directly as the pressure, a correction must be made to the indicator reading to obtain true air speed at higher altitudes. If the temperature and pressure at the flight altitude are known, true air speed may be determined from the indicated air speed, the relation between them being represented by the equation $$V_t = V_i \sqrt{\frac{T_h + K}{T_s + K} \times \frac{P_s}{P_h}}$$

where $V_t$=true air speed
$V_i$=indicated air speed
$T_s$=normal (standard) temperature
$P_s$=normal (standard) pressure
$T_h$=air temperature at flight altitude
$P_h$=air pressure at flight altitude
$K$=a fixed quantity whose value is 459.4 for temperatures in degrees Fahrenheit and 273 for temperatures in degrees centigrade.

It is present practice to provide a slide rule scale suitably calibrated to permit the navigator or pilot to calculate the true air speed from the air speed as indicated by the Pitot-static tube instrument.

In cases where the true air speed is an important factor which must be determined and correlated with other factors in a short period of time as, for example, in electrical computers for aircraft bombing, it is desirable to provide a system of apparatus whereby true air speed may be quickly determined and an electrical quantity proportional thereto introduced into the computer with a minimum number of operations. Applicant conceived the idea that the desired condition could be satisfied by a method in which an electrical quantity is automatically derived which is proportional to the indicated air speed, this derived electrical quantity modified in accordance with required corrections for temperature and pressure and the modified quantity introduced directly into the electrical computer.

The system of apparatus developed in accordance with this conception includes means for deriving and constantly maintaining in an electrical circuit to the computer, a voltage proportional to the needle indication of the differential pressure type indicator and means comprising a voltage divider so designed that the electrical modifications required for corrections both as to temperature and pressure may be introduced by the manual operation of a single control.

The invention will be understood from the following specification by reference to the accompanying drawings in which:

Fig. 1 is a diagrammatic view illustrating the system of electrical apparatus for obtaining an electrical indication of true air speed in accordance with the invention;

Fig. 1A is a diagrammatic view illustrating a voltage divider having a single resistance element which may be employed in place of the voltage divider bounded by lines X—X, Y—Y in Fig. 1.

Fig. 2 is a diagrammatic illustration of the constant impedance voltage divider showing the shape of the resistance elements, their relative angular position and the relative positions of the wiper arms; and Fig. 3 shows the calibration and relative position of the temperature and pressure indicator scales used with the voltage divider.

Referring to Fig. 1, numeral 1 indicates the casing of a Pitot-static tube air speed indicator provided with tubular extensions 2 and 3 to which are connected the aircraft Pitot-static and pressure lines respectively. An indicator needle 4 is movable over a scale 5 calibrated in air speed. The needle 4 is provided with an electrical contact 6. A motor driven shaft 7 is mounted in line with the axis of rotation of meter needle 4. An arm 8, secured for rotation with shaft 7, is provided with an electrical contact 9 which can engage the needle contact 6 through the arc of travel.

Shaft 7 is driven in either direction by means of a split series reversible motor 10 having series field windings 11 and 12. The direction of rotation of motor 10 depends on which one of the field windings 11 and 12 is energized from a suitable source of voltage supplied through lines 13 and 14. Energization of one or the other of the field windings is governed by the position of relay armature 15 with respect to contacts 16 and 17 which are electrically connected to the motor field windings 11 and 12 respectively. The armature 15 is biased to engage contact 17. Movement of this armature to engagement with contact 16 is controlled by relay coil 19, which is energized by closure of contact 6 on needle 4 and contact 9 on follower arm 8.

Anode 23 of a three-element tube 22 and the operating coil 19 are electrically connected to a suitable source of voltage 24 by wires 25 and 26. A cathode 29 is connected to ground by wire 28. A heater element is electrically connected to a suitable source of alternating current (not shown). A grid element 30 is connected through wire 34 to a battery or other suitable source of voltage 33. The voltage drop across resistance 37 is applied to grid 30. In the position as shown in the drawings, that is, with the contacts 6 and 9 open, the grid 30 is negatively biased to prevent current flow to the anode 23, thus preventing operation of relay coil 19. When contact is made between the contacts 6 and 9, an electrical circuit is established from ground through wire 35, contacts 6 and 9, wire 36 to a point between resistance elements 31 and 32, thus short-circuiting resistance 37 to remove the bias from grid 30. This operation thus permits current flow to anode 23 and the operating coil.

The arrangement of condensers 40, 41 and 42 and resistances 43 and 44 constitutes a well-known expedient for reducing sparking at the contacts 16 and 17. Limit switches 45 and 46 in circuit to field windings 11 and 12 respectively, are operable from cams (not shown) rotatably mounted on shaft 7 to limit the rotation of the motor shaft in either direction of rotation.

The operation of the motor controlled follow-up system is as follows: For the position of armature 15 as shown in the drawings, the winding 12 is energized to produce rotation of motor 10 in a direction to make contact between contacts 6 and 9. When this contact is made, relay coil 19 is energized through tube 22 to move armature 15 into engagement with contact 16, thus energizing field winding 11 to produce rotation of the motor shaft in the opposite direction to break the connection between contacts 6 and 9. On breaking of these contacts the original condition is again set up and the motor will rotate the shaft 7 in a direction to again make contact between the contacts 6 and 9. The net result is that the motor shaft 7 assumes a position corresponding to the position of the needle 4 of air speed meter 1. Relay and motor action are sufficiently rapid to cause only a slight vibration of the shaft 7 with negligible load on needle 4.

It will be understood that while a needle contact controlled follow-up system is disclosed, applicant does not intend that his invention be limited to the specific arrangement shown herein as other means for obtaining motor control currents proportional to meter needle deflection may be employed, such as an arrangement of photoelectric cells responsive to needle movement as disclosed in United States Patent 2,167,484, July 25, 1939, to T. M. Berry or an arrangement of fixed condenser plates and movable condenser plates attached to the needle as disclosed in United States Patent 1,970,442, August 14, 1934, to B. A. Wittkuhns et al.

In the disclosure in Fig. 1, a potentiometer 50 connected across the source of voltage 33 is provided with a wiper arm 51 which is secured to motor shaft 7 for rotation therewith. By means of this potentiometer, the wiper arm of which assumes a position corresponding to the position of the air speed indicator needle, a voltage is derived proportional to the needle indication. This derived voltage is then impressed across resistance element 52 and may be read on a voltmeter 53, suitably calibrated in air speeds or fed to an electrical computer over line 54.

Between resistance 52 and meter 53 there is interposed a voltage divider including variable resistance elements 55 and 56 and fixed resistance element 57. Wiper arms 60 and 61 are mechanically connected and each is electrically connected to line 54. By means of this mechanical connection the two wiper arms may be moved together in the same direction over resistance elements 55 and 56.

The voltage divider disclosed in Figs. 1 and 2 is so designed that for all the necessary adjustments of its shunt and series resistances, the total impedance to the output current remains constant. Theoretically, a voltage divider having one resistance element 55' as shown in Fig. 1A could be employed for fractionalizing the derived voltage when the output is connected to a high impedance circuit. However, as practical considerations dictate that the total impedance to the output current remain constant in the present case wherein the computer is a low impedance circuit, the circuit arrangement employing two variable resistance elements as a constant impedance voltage divider, is employed.

The formula as given above for obtaining true air speed from indicated air speed may be expressed in terms of the ratio of true air speed to indicated air speed, that is, it may be expressed $$\frac{V_t}{V_i} = \sqrt{\frac{T_A + K}{T_s + K} \times \frac{P_s}{P_A}}$$

This ratio of speeds is, therefore, expressed in terms of a product of a function of temperature and one of pressure. If this ratio is expressed in terms of the sum of a function of temperature and one of pressure, that is, if it is expressed $$\log \frac{V_t}{V_i} = \tfrac{1}{2} \log \frac{T_h+K}{T_s+K} + \tfrac{1}{2} \log \frac{P_s}{P_h}$$

the correct ratio of true air speed voltage to indicated air speed voltage may be obtained in an electrical circuit by resistance wiper arm motion which is the sum of a pressure effect and a temperature effect, provided the variable resistance is shaped to give an exponential variation in resistance along its length.

If $\rho$ represents the ratio of the resistance between the variable tap and ground to the total resistance of a resistance element, the ratio $\rho$ of a suitable resistance can be expressed $\rho = 10^{a\theta+b}$ where $\theta$ is the distance along the resistance element and $a$ and $b$ are constants, the values of which depend upon the length of the resistance element and the variation of voltage desired from one end of the resistance element to the other.

This ratio can be expressed as log $\rho = a\theta + b$ which is in turn equal to log $$\frac{V_t}{V_i}$$

Therefore $$a\theta + b = \tfrac{1}{2} \log \frac{T_h+K}{T_s+K} + \tfrac{1}{2} \log \frac{P_s}{P_h}$$

As it is desired to obtain an exponential variation of voltage ratio with motion of the movable tap of the resistance element, the size and shape of resistance elements 55 and 56 are determined by the substitution of suitable values in the formula $\rho = 10^{a\theta+b}$ and by the requirement that the total impedance of the combination of resistance elements 55, 56 and 57 be maintained constant. The variable resistance element designed in accordance with this formula will therefore give in the circuit shown the desired exponential variation of voltage ratio.

Referring to Fig. 2, the resistance elements 55 and 56 are each circularly arranged about a shaft 70, to which is secured the resistance wiper arms 60 and 61. This shaft may be rotated by manual operation of a control knob 71.

The wiper arms 60 and 61 are moved together by manual rotation of shaft 70. In the position as shown in the drawings, the output voltage of the voltage divider will produce an air speed reading on meter 53 which will be the same as the indicated air speed reading on instrument 1.

It is generally true that the density of the air is reduced at altitudes higher than ground level. The differential pressure instrument which is dependent on air density will therefore give an air speed reading at higher altitudes which is lower than the true air speed. The voltage derived by means of potentiometer 50 should therefore be modified at higher altitudes in a manner to increase the reading on meter 53. As will be explained hereinafter, the indicator scales guiding the movement of shaft 70 are so related and calibrated that for higher altitudes the shaft 70 is turned in a direction to reduce the resistance of element 55 while at the same time increasing the resistance of element 56 to maintain the constant total impedance condition.

In accordance with this invention a logarithmically graduated scale representing one variable quantity is made movable with the resistance wiper arm relative to a stationary, logarithmically graduated scale representing the second variable quantity. Fig. 3 shows the preferred arrangement in which the logarithmic pressure scale 72 having scale indications in terms of altitude is attached to the wiper arm shaft 70 for movement relative to a fixed, logarithmically graduated temperature scale 73.

Referring to Fig. 3, the shaft 70 has secured thereto a circular dial 72 which is provided with an altitude scale comprising scale markings from 0 to 30,000 feet. This dial 72 is movable with shaft 70 with the scale indications thereof adjacent a fixed member 73 provided with indications of temperature from $-40°$ to $+60°$ C.

The distance between each of the indications from 0 to 30,000 feet on the altitude scale is obtained by substituting for $P_h$ in the formula $$a\theta + b = \tfrac{1}{2} \log \frac{P_s}{P_h}$$

the values representing the standard pressure of air in millimeters of mercury for each altitude represented on the scale, the value for $P_s$ being 760. The spacing of the graduations from 0 to 30,000 feet altitude for movable scale 72 are shown in the following table:

| Spacing of Graduations From 0 to 30,000 Feet | |
|---|---|
| 0– 1,000 | 7°32′ |
| 1,000– 2,000 | 7°36′ |
| 2,000– 3,000 | 7°40′ |
| 3,000– 4,000 | 7°44′ |
| 0– 5,000 | 38°20′ |
| 5,000– 6,000 | 7°52′ |
| 6,000– 7,000 | 7°56′ |
| 7,000– 8,000 | 8° 0′ |
| 8,000– 9,000 | 8° 4′ |
| 0–10,000 | 78°20′ |
| 10,000–11,000 | 8°12′ |
| 11,000–12,000 | 8°16′ |
| 12,000–13,000 | 8°20′ |
| 13,000–14,000 | 8°24′ |
| 0–15,000 | 120°0′ |
| 15,000–16,000 | 8°32′ |
| 16,000–17,000 | 8°36′ |
| 17,000–18,000 | 8°40′ |
| 18,000–19,000 | 8°44′ |
| 0–20,000 | 163°20′ |
| 20,000–21,000 | 8°52′ |
| 21,000–22,000 | 8°56′ |
| 22,000–23,000 | 9° 0′ |
| 23,000–24,000 | 9° 4′ |
| 0–25,000 | 208°20′ |
| 25,000–26,000 | 9°12′ |
| 26,000–27,000 | 9°16′ |
| 27,000–28,000 | 9°20′ |
| 28,000–29,000 | 9°24′ |
| 0–30,000 | 255°0′ |

The distance between each of the indications from $-40°$ to $+60°$ on the temperature scale is obtained by substituting for $T_h$ in the formula $$a\theta + b = \tfrac{1}{2} \log \frac{T_h+K}{T_s+K}$$

the different values of temperatures to be represented on the scale, the value of $T_s$ being 15° C. and the constant K being 273. The spacing of the graduations from $-40°$ to 60° centigrade temperature for fixed scale 73 are shown in the following table:

| 60–50 | 50–40 | 40–30 | 30–20 | 20–10 | 10–0 | 0– –10 | –10– –20 | –20– –40 | –40– –50 |
|---|---|---|---|---|---|---|---|---|---|
| 6° 23′ | 6° 36′ | 6° 50′ | 7° 4′ | 7° 19′ | 7° 34′ | 7° 50′ | 8° 8′ | 8° 28′ | 8° 49′ |

The position of the scales in the drawings is for the average temperature and pressure at ground level, that is, zero altitude at 15° C. In the position as shown in Fig. 3, the scale corresponds to the position of the wiper arms 60 and 61 as shown in Fig. 2.

It will be obvious from this disclosure that by operating the single control knob 71 to position the altitude dial indication corresponding to known altitude opposite the scale indication corresponding to known temperature at flight altitude, the voltage divider will produce the variation in voltage ratio required for both temperature and pressure corrections at the flight altitude.

What is claimed is:

1. A system for producing an electrical quantity proportional to true air speed in air of known temperature and pressure comprising in combination an air speed indicating instrument having an indicating element, a source of voltage, means for continuously deriving a voltage from said source proportional to the movement of the indicating element of said instrument, an electrical circuit including said source of voltage, said voltage deriving means and means for modifying the derived voltage from said source, said last-named means comprising a variable resistance having a variable element, and means for determining the variation of said resistance comprising in combination a stationary scale and a scale movable with the variable element of said resistance adjacent said stationary scale, one of said scales being calibrated in terms of temperature and the other of said scales being calibrated in terms of altitude.

2. A system for producing an electrical quantity proportional to true air speed in air of known temperature and pressure comprising in combination an air speed instrument having an indicating member, a source of voltage, means for continuously deriving a voltage from said source proportional to the position of the indicating member of said instrument, an electrical circuit including said source of voltage, said voltage deriving means, and means for modifying the voltage derived from said source proportional to said known temperature and pressure, said last-named means comprising a variable resistance producing an exponential variation in variation in voltage ratio with movement of its adjustable tap, and means determining the movement of said tap comprising a logarithmic temperature scale and a logarithmic pressure scale, one of said scales being movable with said resistance tap.

3. A system for deriving an electrical quantity proportional to true air speed in air of known pressure and temperature and comprising in combination an air speed instrument having an indicating element, an electrical circuit including a source of voltage, a potentiometer having a movable element and an electrical element utilizing the voltage from said source, means electrically associated with the indicating element of said instrument and mechanically associated with said potentiometer for positioning the movable element thereof in acordance with the position of said instrument indicating element, voltage dividing means in the circuit from said potentiometer including a variable resistance designed to produce an exponential variation in voltage ratio with movement of its movable element, and means associated with the movable element of said variable resistance comprising a logarithmic temperature scale and a logarithmic pressure scale, one of said scales being fixed and the other of said scales being movable with the movable element of said resistance.

4. A system for deriving an electrical quantity proportional to true air speed in air of known temperature and pressure comprising in combination an air speed instrument having an indicating element, an electrical circuit including in combination a source of voltage, means for continuously deriving a voltage from said source proportional to the position of the indicating element of said instrument, means for fractionalizing said derived voltage proportionally to said known temperature and pressure and a utilization circuit connected to said fractionalizing means, said fractionalizing means comprising a voltage divider having an exponentially graded variable resistance in series with said utilization circuit and an exponentially graded variable resistance in shunt with said utilization circuit, a manually operable unitary control means for varying said resistances, and means determining the movement of said control means comprising a stationary, logarithmically graduated temperature scale and a logarithmic pressure scale having scale indications in terms of the altitude corresponding to the pressure and movable with said control means adjacent said temperature scale.

CHARLES H. TOWNES.

REFERENCES CITED

The following references are of record in the file of this patent:

UNITED STATES PATENTS

| Number | Name | Date |
|---|---|---|
| 1,120,214 | Metzdorff | Dec. 8, 1914 |
| 1,573,850 | Naiman | Feb. 23, 1926 |
| 1,847,105 | Spitzglass | Mar. 1, 1932 |
| 1,986,986 | Swartout | Jan. 8, 1935 |
| 2,222,551 | Ziebolz et al. | Nov. 19, 1940 |
| 2,318,153 | Gilson | May 4, 1943 |

FOREIGN PATENTS

| Number | Country | Date |
|---|---|---|
| 281,527 | Germany | Jan. 13, 1915 |
| 482,660 | Germany | Sept. 20, 1929 |
| 516,198 | Great Britain | Dec. 27, 1939 |
| 517,321 | Great Britain | Jan. 26, 1940 |

Certificate of Correction

Patent No. 2,457,287.                                                              December 28, 1948.

CHARLES H. TOWNES

It is hereby certified that error appears in the printed specification of the above numbered patent requiring correction as follows:

Column 1, line 40, after the word "speed" strike out *less*;

and that the said Letters Patent should be read with this correction therein that the same may conform to the record of the case in the Patent Office.

Signed and sealed this 11th day of October, A. D. 1949.

[SEAL]

THOMAS F. MURPHY,
*Assistant Commissioner of Patents.*